Aug. 26, 1930.  R. PECORA  1,774,488
PROPELLER SHAFT THRUST BEARING SLEEVE
Filed Feb. 28, 1927
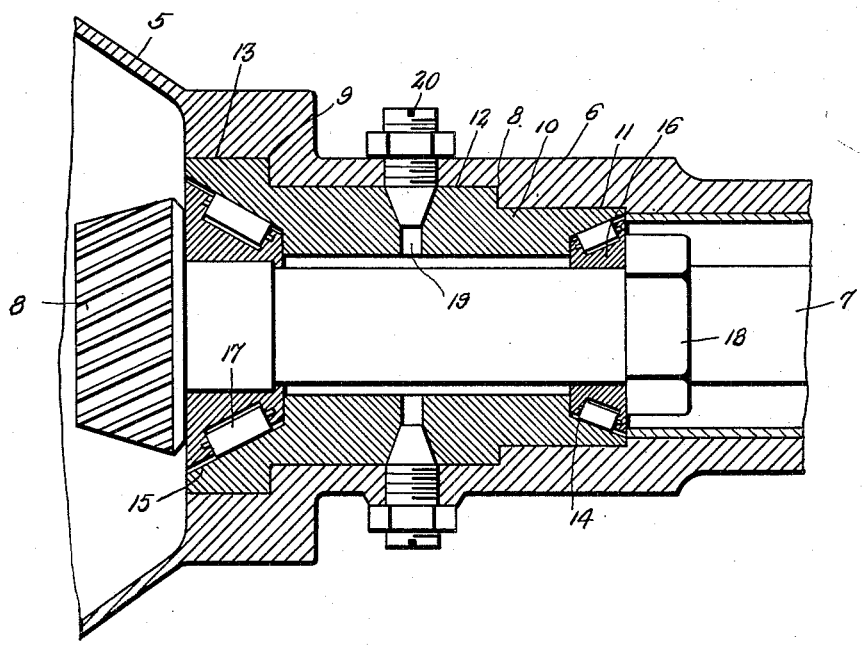
Inventor
*Rocco Pecora,*
By *Clarence A. O'Brien*
Attorney Patented Aug. 26, 1930

1,774,488

UNITED STATES PATENT OFFICE

ROCCO PECORA, OF BELTON, TEXAS

PROPELLER-SHAFT THRUST-BEARING SLEEVE

Application filed February 28, 1927. Serial No. 171,562.

The present invention relates to a propeller shaft thrust bearing sleeve and has for its prime object to provide a structure of this nature which may be used and constructed to fit practically all makes of automobiles and automobile trucks.

Another important object of the invention lies in the provision of a thrust bearing sleeve structure of this nature which enables tapered cone bearings to be used in association with the drive shaft adjacent the differential of an automobile drive mechanism.

A still further important object of the invention lies in the provision of a propeller shaft thrust bearing sleeve of this nature which is simple in its construction, comparatively inexpensive to manufacture, strong and durable, thoroughly efficient and reliable in operation, and otherwise well adapted to the purpose for which it is designed. With the above and numerous other objects in view as will appear as the description proceeds, the invention resides in certain novel features of construction, and in the combination and arrangement of parts as will be hereinafter more fully described and claimed.

In the drawing:—

The figure is a sectional view through the propeller shaft housing showing my improved thrust bearing sleeve on the propeller shaft.

Referring to the drawing in detail, it will be seen that 5 designates a differential housing and 6 the propeller shaft housing in which is mounted in the usual manner the propeller shaft 7 which has on its end within the housing 5 the usual well known drive pinion 8. The features thus far described are conventional and are illustrative of the well known Chevrolet rear end construction. It is apparent, however, that this structure has been disclosed in detail merely by way of example as my improvements are susceptable of use upon practically all automobile rear end constructions.

The interior diameter of the shaft housing 6 is increased to form a shoulder 8 and again increased to form a shoulder 9 in the present instance. A sleeve 10 is provided the exterior diameter of which at one end, as at 11, is smaller than the intermediate portion as at 12 thereby forming a shoulder to abut the shoulder 8 and the other end 13 is larger in diameter than the intermediate portion thereby forming a shoulder to abut the shoulder 9. The interior of the sleeve 10 at its ends is formed with frusto-conical recesses 14 and 15 the latter being larger than the former as is quite apparent from an inspection of the drawing. A tapered cone bearing 16 of the roller type is disposed in the recess 14 and a similar bearing 17 is disposed in the recess 15 for receiving the drive shaft 7. These bearings 16 and 17 are held in place on the shaft by the drive pinion 8 and the usual propeller shaft bearing nut 18. The sleeve is provided with radial openings 19 the outer ends of which flare outwardly as at 20 to form frusto-conical recesses. Bearing lock sleeve screws 21 are threaded through openings in the housing 6 so that their tapered ends engage in the recesses 20 as is clearly shown in the drawing.

It is thought that the construction, advantages, and utility of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction and in the sizes, combination and arrangement of parts may be resorted to without departing from the spirit or scope of the invention as hereinafter claimed or sacrificing any of its advantages.

Having thus described my invention, what I claim as new is:—

A bearing assembly comprising in combination a housing, a propeller shaft, a pinion on one end of the shaft, a bearing nut on the shaft spaced from the pinion, the said housing having an intermediate tubular portion merging at one end into a relatively small bearing ring and at its other end into a relatively large bearing ring, a sleeve positioned about the shaft within the housing between the pinion and the nut, the said sleeve comprising an elongated tubular body, the exterior diameter at one end being less than the intermediate exterior diameter and the exterior diameter of the other end being larger than the intermediate exterior diameter, the intermediate portion of the sleeve being positioned within the intermediate tubular portion of the housing, the ends of the sleeve being hollowed out to provide frusto-conical recesses, inner bearing races secured upon the shaft, one against the pinion and the other against the nut, bearings carried by said races, the said frusto-conical recesses of the said sleeve forming outer races for said bearings, and a plurality of pins secured to the housing and extending into recesses in the said sleeve to hold the sleeve in position, substantially as set forth.

In testimony whereof I affix my signature.

ROCCO PECORA.